(12) United States Patent
Bushida et al.

(10) Patent No.: US 10,093,471 B2
(45) Date of Patent: Oct. 9, 2018

(54) CONTAINER

(71) Applicants: SUNTORY BEVERAGE & FOOD LIMITED, Tokyo (JP); SUNTORY HOLDINGS LIMITED, Osaka (JP)

(72) Inventors: Mitsuru Bushida, Tokyo (JP); Daisuke Tanaka, Tokyo (JP); Takashi Kado, Tokyo (JP); Hiroki Yokoyama, Tokyo (JP); Masayuki Kitamasu, Tokyo (JP)

(73) Assignees: SUNTORY BEVERAGE & FOOD LIMITED, Tokyo (JP); SUNTORY HOLDINGS LIMITED, Osaka (JP)

( * ) Notice: Subject to any disclaimer, the term of this patent is extended or adjusted under 35 U.S.C. 154(b) by 0 days.

(21) Appl. No.: 14/902,088

(22) PCT Filed: Jun. 27, 2014

(86) PCT No.: PCT/JP2014/067244
§ 371 (c)(1),
(2) Date: Dec. 30, 2015

(87) PCT Pub. No.: WO2015/002099
PCT Pub. Date: Jan. 8, 2015

(65) Prior Publication Data
US 2016/0368686 A1 Dec. 22, 2016

(30) Foreign Application Priority Data
Jul. 1, 2013 (JP) .................. 2013-138348

(51) Int. Cl.
*B65D 77/20* (2006.01)
*B65D 35/52* (2006.01)
(Continued)

(52) U.S. Cl.
CPC ........ *B65D 77/2036* (2013.01); *A47J 31/407* (2013.01); *A47J 31/41* (2013.01);
(Continued)

(58) Field of Classification Search
CPC ... A47J 31/407; B65D 75/5822; B65D 75/32; B65D 1/26; B65D 1/32; B65D 1/42;
(Continued)

(56) References Cited

U.S. PATENT DOCUMENTS 3,179,301 A * 4/1965 Lucht ................. B65D 47/2031
215/11.1
4,158,376 A * 6/1979 Erb ....................... B65D 1/0292
220/666
(Continued)

FOREIGN PATENT DOCUMENTS

CN 102745407 10/2012
JP 2007-525385 9/2007
(Continued)

OTHER PUBLICATIONS

English Language Machine Translation of JP2012-135518.
(Continued)

*Primary Examiner* — J. Gregory Pickett
*Assistant Examiner* — Gideon Weinerth
(74) *Attorney, Agent, or Firm* — Greenblum & Bernstein, P.L.C.

(57) ABSTRACT

Provided is a container that allows a portion where detachment starts to be fixed at a specified position in a more reliable manner, thus allowing contents to be discharged in a direction expected by a user, allowing eventually reduction in the amount of contents to remain in the container in the end. The container includes a container body holding contents therein and a lid member, the container body and the lid member being sealed by an annular seal portion formed along a flanged face of the opening. There is provided a detaching seal portion which is detached in response to increase of pressure inside the container body associated with deformation of the container body. The detaching seal
(Continued)

portion includes a reverse-oriented annular seal portion which occupies a part of a width of the flanged face and which projects toward a radial inner side of the opening.

5 Claims, 6 Drawing Sheets

(51) Int. Cl.
| | |
|---|---|
| B65D 17/28 | (2006.01) |
| B65D 17/32 | (2006.01) |
| B65D 83/00 | (2006.01) |
| A47J 31/41 | (2006.01) |
| B65D 1/26 | (2006.01) |
| B65D 1/40 | (2006.01) |
| A47J 31/40 | (2006.01) |
| B65B 69/00 | (2006.01) |
| B65D 85/804 | (2006.01) |
| B65D 1/32 | (2006.01) |

(52) U.S. Cl.
CPC .............. *B65B 69/005* (2013.01); *B65D 1/26* (2013.01); *B65D 1/40* (2013.01); *B65D 85/8043* (2013.01); *B65D 1/32* (2013.01); *B65D 2577/2066* (2013.01)

(58) Field of Classification Search
CPC ............ B65D 77/2036; B65D 77/2064; B65D 85/8043; B65D 2577/2066; B65D 83/0094; B65D 2575/366; B65D 77/36; B65D 1/0292; B65D 21/086; B65D 21/068; B65D 83/0055; B65D 83/0072; B65D 83/0022; B65D 75/48; B65D 75/58; B01F 3/088; B01F 15/0087; B01F 2003/0896; B01F 13/0033; B67D 7/0216
USPC ....... 220/281, 666, 276, 359, 359.2; 156/69, 156/581, 292, 308.4, 379.8; 222/541.4, 222/95, 96, 107, 541.3, 491, 92; 206/469, 484, 631, 219, 604; 99/295, 99/323.3; 53/133.1, 412, 329.2, 329.3, 53/478; 229/123.1, 125.35; 426/77, 110, 426/111, 112, 115, 119, 394, 404
See application file for complete search history.

(56) References Cited

U.S. PATENT DOCUMENTS

| | | | | | |
|---|---|---|---|---|---|
| 4,301,923 | A | * | 11/1981 | Vuorento | B65D 75/5822 206/484 |
| 4,770,295 | A | * | 9/1988 | Carveth | B29C 66/81431 156/273.7 |
| 4,913,307 | A | * | 4/1990 | Takata | B29C 65/18 156/69 |
| 4,961,302 | A | * | 10/1990 | Davis | B29C 65/18 156/583.1 |
| 4,961,513 | A | * | 10/1990 | Gossedge | B29C 65/18 156/69 |
| 4,969,965 | A | * | 11/1990 | Matty | B29C 65/18 156/220 |
| 4,978,055 | A | * | 12/1990 | Miller | A45C 11/24 150/146 |
| 5,141,594 | A | * | 8/1992 | Walter | B29C 65/18 156/581 |
| 5,164,208 | A | * | 11/1992 | Thomas, Jr. | B29C 65/18 156/581 |
| 5,546,728 | A | * | 8/1996 | Dekeyser | B65D 75/366 222/107 |
| 6,540,855 | B1 | * | 4/2003 | Holmberg | B29C 65/02 156/292 |
| 6,843,042 | B2 | * | 1/2005 | Nakabayashi | B29C 65/02 156/69 |
| 8,608,895 | B2 | * | 12/2013 | Sato | B29C 65/18 156/292 |
| 8,784,915 | B2 | * | 7/2014 | Evers | A47J 31/407 220/203.08 |
| 8,857,663 | B2 | * | 10/2014 | Scholvinck | B65D 77/2036 206/469 |
| 9,023,411 | B2 | * | 5/2015 | Maatta | B65D 77/2024 206/497 |
| D757,540 | S | * | 5/2016 | Bushida | D9/434 |
| 2002/0119221 | A1 | * | 8/2002 | Matsukura | A23G 9/28 426/115 |
| 2006/0182912 | A1 | | 8/2006 | Sato | |
| 2008/0148948 | A1 | | 6/2008 | Evers et al. | |
| 2008/0230571 | A1 | | 9/2008 | Sterngold et al. | |
| 2009/0202684 | A1 | * | 8/2009 | Willemsen | B65D 1/32 426/110 |
| 2010/0326283 | A1 | | 12/2010 | Evers et al. | |
| 2011/0011273 | A1 | * | 1/2011 | Evers | A47J 31/407 99/295 |
| 2011/0142996 | A1 | * | 6/2011 | Kruger | B65D 85/8043 426/80 |
| 2012/0241455 | A1 | | 9/2012 | Schoelvinck et al. | |
| 2012/0260806 | A1 | * | 10/2012 | Rolfes | A47J 31/38 99/285 |
| 2012/0318801 | A1 | * | 12/2012 | Wolters | B65D 77/204 220/359.2 |
| 2014/0069927 | A1 | * | 3/2014 | Willemsen | B65D 77/2052 220/359.2 |
| 2014/0263375 | A1 | * | 9/2014 | Willemsen | B65D 1/32 220/666 |
| 2015/0245733 | A1 | * | 9/2015 | Castellani | A47J 31/0673 426/112 |
| 2015/0353273 | A1 | * | 12/2015 | Negus | B65D 77/2064 220/265 |
| 2016/0145026 | A1 | * | 5/2016 | Bushida | A47J 31/41 220/281 |
| 2016/0368651 | A1 | * | 12/2016 | Bushida | B65D 77/2036 |
| 2016/0368685 | A1 | * | 12/2016 | Bushida | B01F 13/0022 |
| 2016/0368686 | A1 | * | 12/2016 | Bushida | A47J 31/407 |
| 2016/0368687 | A1 | * | 12/2016 | Bushida | B65D 77/2028 |
| 2016/0368688 | A1 | * | 12/2016 | Bushida | B65D 77/2036 |
| 2016/0368690 | A1 | * | 12/2016 | Yokoyama | B65D 77/003 |
| 2017/0073145 | A1 | * | 3/2017 | Ishikawa | B65D 81/3453 |

FOREIGN PATENT DOCUMENTS

| | | |
|---|---|---|
| JP | 2009-520644 | 5/2009 |
| JP | 2010-275013 | 12/2010 |
| JP | 2012-135518 | 7/2012 |

OTHER PUBLICATIONS

International Preliminary Report on Patentability for PCT/JP2014/067244, dated Jan. 5, 2016.
English language machine translation of JP 2010-275013.
U.S. Appl. No. 14/902,119 to Mitsuru Bushida et al., filed Dec. 30, 2015.
U.S. Appl. No. 14/902,116 to Mitsuru Bushida et al., filed Dec. 30, 2015.
U.S. Appl. No. 14/902,082 to Mitsuru Bushida et al., filed Dec. 30, 2015.
U.S. Appl. No. 14/902,077 to Mitsuru Bushida et al., filed Dec. 30, 2015.
U.S. Appl. No. 14/902,109 to Mitsuru Bushida et al., filed Dec. 30, 2015.
International Search Report issued in PCT/JP2014/067244, dated Sep. 30, 2014.

* cited by examiner

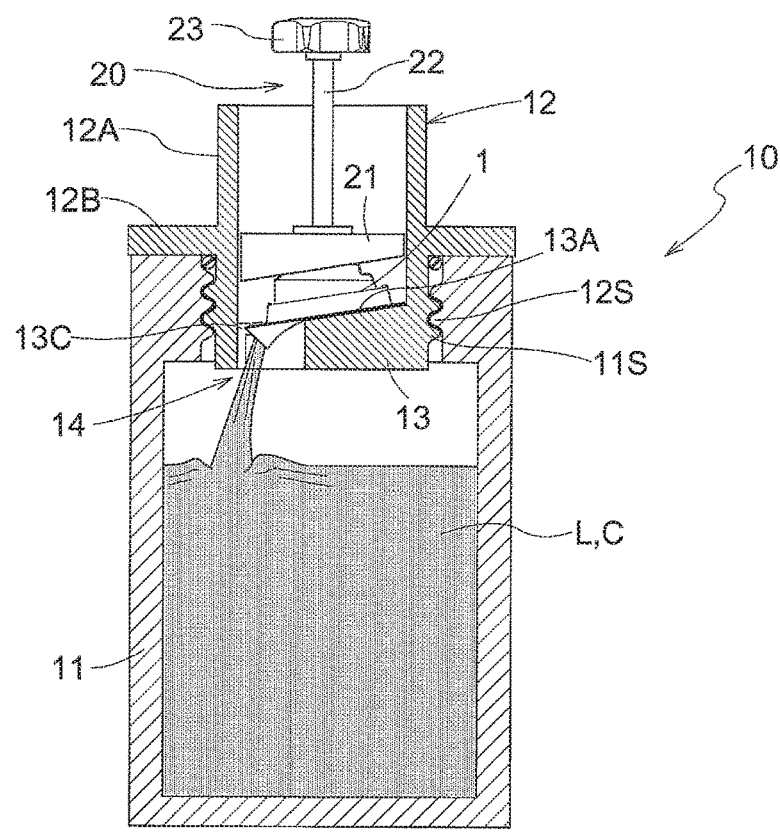
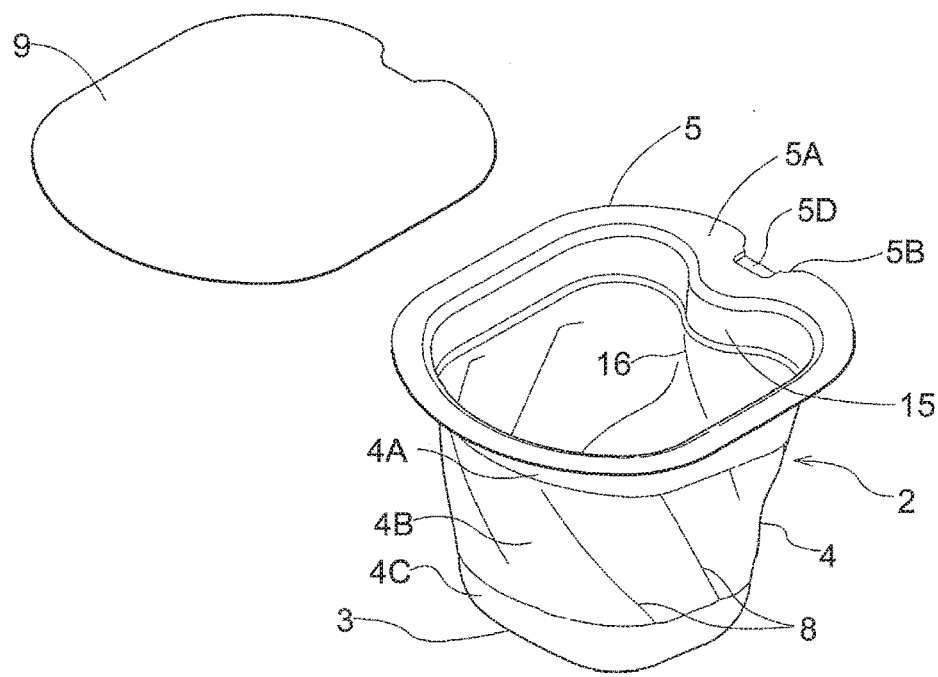

CONTAINER

TECHNICAL FIELD

The present invention relates to a container including a container body holding contents therein and a lid member for closing an opening of the container body, the container body and the lid member being sealed with each other by an annular seal portion formed along a flanged face of the opening, a portion of the annular seal portion being detached in response to increase of pressure inside the container body associated with deformation of the container body resulting from application of an external force to a bottom face of the container body.

BACKGROUND ART

Patent Document 1 identified below exists as an example of background art information relating to this type of container. In the case of the container disclosed in this Patent Document 1, when the bottom face of the container is pressed from above with the container under a posture of orienting the lid member downwards being set to a bottom portion of a setting space present upwardly of a dilution bottle, the pressure inside the container body increases to cause detachment of a portion of the annular seal portion from the flanged face, whereby the contents are discharged into the dilution bottle.

Therefore, if a liquid of concentrated beverage ingredient is used as the contents of the container, beverage of an appropriate concentration can be obtained by introducing water or the like into the dilution bottle.

Further, in the case of Patent Document 1, the lid member is sealed over a relatively large area extending along the flanged face entirely in its width direction. And, at a portion of the flanged face located at its radially inner edge, a sharp projecting portion projecting towards the radially inner side is provided as an exfoliation guiding portion.

BACKGROUND ART DOCUMENT

Patent Document

Patent Document 1: Japanese Unexamined Patent Application Publication No. 2012-135518 (paragraph [0017], paragraph [0021], FIG. 1).

SUMMARY

Problem to be Solved by Invention

However, with the container disclosed in Patent Document 1, since the sealing is provided along the flanged face over the entire width direction thereof, the inside pressure required for unsealing a portion of the annular seal portion tends to be too high. Further, in spite of the presence of the sharp projecting portion, the portion at which the detachment starts will not be fixed at the exfoliation guiding portion, so that the contents may be discharged in a direction unexpected by a user. Also, as a result of the above, it was not possible to sufficiently reduce the amount of contents to remain finally inside the container.

Then, an object of the present invention, in view of the above-described problem provided by the background art, is to provide a container that allows a portion where detachment starts to be fixed at a specified position in a more reliable manner, thus allowing contents to be discharged in a direction expected by a user, allowing eventually reduction in the amount of contents to remain in the container in the end.

Solution

According to a characterizing feature of a container relating to the present invention, the container comprises:

a container body holding contents therein and a lid member for closing an opening of the container body, the container body and the lid member being sealed with each other by an annular seal portion formed along a flanged face of the opening;

wherein at a specified portion of the annular seal portion, there is provided a detaching seal portion which is detached in response to increase of pressure inside the container body associated with deformation of the container body; and the detaching seal portion includes a reverse-oriented annular seal portion which occupies a part of a width of the flanged face and which projects toward a radial inner side of the opening.

With the container having the above-described characterizing feature, when the detaching seal portion is detached in response to increase of the inside pressure inside the container body, detachment will occur at the reverse-oriented annular seal portion which occupies a part of a width of the flanged face and which projects toward a radial inner side of the opening, prior to detachment of the remaining portion of the annular seal portion. Therefore, a user can know in advance and with high precision from which part of the opening the contents will be discharged. Consequently, the amount of the contents to remain inside the container in the end can be reduced sufficiently.

Further, with the container having the above-described characterizing feature, as a result of detachment of the reverse-oriented annular seal portion, an opening having a constant width can be formed, so that the contents can be discharged in a stable manner.

According to a further characterizing feature of the present invention, there is provided an auxiliary detaching seal portion which connects opposed ends on the radial outer side of the reverse-oriented annular seal portion.

With the above-described arrangement, the provision of the auxiliary detaching seal portion interconnecting the opposed ends on the radial outer side of the reverse-oriented annular seal portion serves to effectively restrict occurrence of an inconvenient phenomenon that inadvertent detachment occurs in the annular seal portion, in particular, at the vicinity of the reverse-oriented annular seal portion in response to application of a force to the outer side of the container in the course of its distribution such as transportation, storage, etc. rather than in response to the inside pressure inside the container body. Incidentally, when detachment of the reverse-oriented annular seal portion is caused by inside pressure inside the container body, the auxiliary detaching seal portion will be detached relatively easily. One possible reason for this is deemed to be associated with a phenomenon that due to the effect of the above inside pressure, the lid member is detached continuously from the flanged face from the left and right opposed ends towards the center of the auxiliary detaching seal portion.

According to a still further characterizing feature of the present invention, an outflow channel for discharging the contents extends radially outwards from the detaching seal portion; and at positions facing the outflow channel from the left and right sides thereof, there are provided non-detaching seal portions comprised of a plurality of annular seal portions extending along a circumferential direction.

As the non-detaching seal portions are comprised of a plurality of annular seal portions extending along the circumferential direction, these portions are sealed with each other with a sufficiently higher bonding force than the other annular seal portion extending as a single portion. Therefore, with the above-described arrangement, even when increase of the inside pressure occurs at an unexpected high rate, detachment of the reverse-oriented annular seal portion will not extend to reach the non-detaching seal portion, so that the sealed state can be maintained. As a result, the width of the flow channel for discharged contents will be limited, so that the direction to which the discharged contents will proceed can be anticipated easily. Moreover, in the case of a usage of opening the container as this container is set inside some other auxiliary container, an area where the contents will flow in the inner face of this auxiliary container will be limited conveniently.

According to a still further characterizing feature of the present invention, the detaching seal portion and the non-detaching seal portion are connected to each other via a pair of left and right connecting annular seal portions; and between a portion of the pair of connecting annular seal portions and the outflow channel, there are provided a pair of auxiliary non-detaching seal portions facing each other across the outflow channel therebetween.

With the above-described arrangement, detachment at the reverse-oriented annular seal portion will not extend to reach the non-detaching seal portion, and will also not reach the auxiliary non-detaching seal portion, so that the sealed state will be maintained at the auxiliary non-detaching seal portion as well. As a result, the channel for discharged contents will be further reduced in its width advantageously.

According to a still further characterizing feature of the present invention, at a position of the flanged face of the container body corresponding to the outflow channel, there is formed an outflow groove sunk toward the bottom of the container body.

With the above-described arrangement, when a portion of the annular seal portion is unsealed starting from the reverse-oriented annular seal portion, between the lid member and the outflow channel, an outflow channel having a relatively sufficient vertical thickness will be formed. As a result, spreading of the flow channel for the discharged contents in the width direction will occur less likely, so that the contents will fall onto a relatively fixed position easily.

According to a still further characterizing feature of the present invention, the annular seal portion is provided in the form of a groove sunk in the thickness direction of the flanged face by pressing the lid member against the flanged face via a seal bar having at its leading end an annular projection having a shape corresponding to the annular seal portion; and the reverse-oriented annular seal portion is provided as an uneven sealing force groove having a smaller curvature radius on its radial inner side than its radial outer side.

With the above-described arrangement, at the portion located on the radial inner side of the reverse-oriented annular seal portion, the detachment will be started with application of a relatively low inside pressure as compared with the remaining annular seal portion. Therefore, the reverse-oriented annular seal portion projecting toward the radial inner side will function as the detachment starting point in a reliable manner. On the other hand, the portion located on the radial outer side of the reverse-oriented annular seal portion has an ordinary cross sectional shape sunk toward the bottom face at an angle equal or approximately equal to the other annular seal portion, so the inconvenience of inadvertent unsealing of the lid member by application of an external force in the course of distribution or the like is prevented.

BRIEF DESCRIPTION OF THE DRAWINGS

FIG. 3 is a section view showing the dilution bottle and the container which has been deformed and unsealed, FIG. 4 is a section view showing a container body and a lid member of the container.

EMBODIMENTS

Next, embodiments of the present invention will be described with reference to the accompanying drawings.
(General Configuration of Container)

Figure 1:
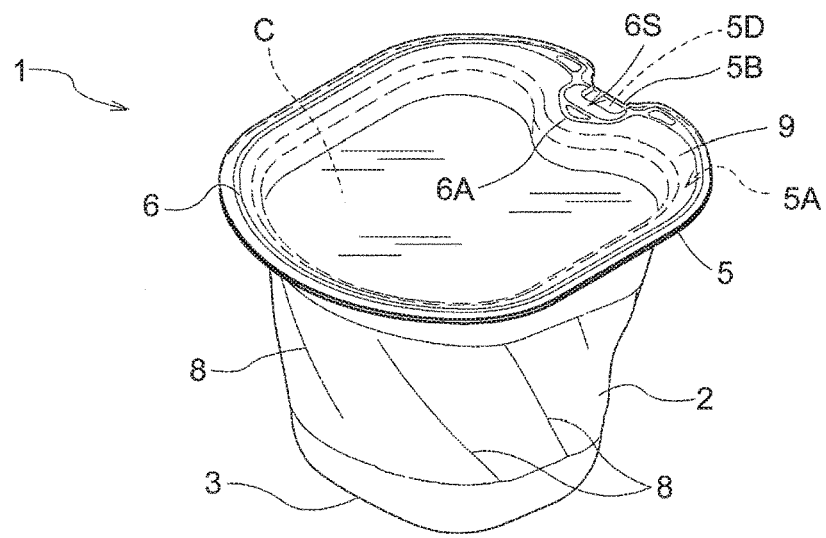
FIG. 1 is a perspective view showing appearance of a container.

FIG. 1 shows a portion container 1 as an example of "container" relating to the present invention. This portion container 1 includes a container body 2 formed of resin and holding an amount of contents C in form of e.g. liquid therein and having a bottom and a lid member 9 formed of resin and configured to close an opening of the container body 2 in a sealing manner. At least a portion of the container body 2 is configured to be readily deformable by an external force.

The container body 2 and the lid member 9 are originally sealed with each other via an annular seal portion 6 formed annularly along a flanged face 5A of a flange 5 extending radially outwards from the opening of the container body 2. In response to a pressing pressure applied to e.g. a bottom face 3 of the container body 2, a portion of the container body 2 will be deformed in such a manner to reduce the inside volume of this container body 2. Then, when the pressure inside the container body 2 rises to reach a critical value, exfoliation (an example of "detachment") of the lid member 9 from the flanged face 5A occurs at a portion of the annular seal portion 6, thus effecting unsealing of the container.

Incidentally, even when some air is present in the container body 2 together with the contents C, if the unsealing is effected under a state of reverse-orienting the portion container 1 with the lid member 9 disposed downwards, the contents C, rather than the air, will be charged first.

At a specified position in the annular seal portion 6, there is provided a detaching seal portion 6S, 6R which can be detached more easily by increase of the inside pressure of the container body 2 than the remaining portion of the annular seal portion 6. Therefore, the above ensures that the position of the lid member 9 to be detached from the flanged face 5A with the increased inside pressure of the container body 2 will always be present at the position of this detaching seal portion 6S, so that the user can readily anticipate the advancing or discharging direction of the discharged contents C.

As shown in FIG. 1 and FIG. 4, at a portion of the flange 5 of the container body 2, there is formed an engaged sunk portion 5B sunk to the radially inner side (this engaged sunk portion 5B will appear as a "dent" in the outer shape of the flange 5 as seen in its plane view). And, at an area of the flanged face 5A corresponding to the engaged sunk portion 5B, there is formed an outflow groove 5D which is sunk toward the bottom face 3 and which is formed generally rectangular in the plane view (this outflow groove 5D will appear as a dent in the outer shape of the flange 5 as seen its front view or side view). This outflow groove 5D constitutes an outflow channel through which the contents C will flow upon exfoliation of the detaching seal portion 6S. The detaching seal portion 6S is disposed at an angular position corresponding to these members, i.e. the engaged sunk portion 5B and the outflow groove 5D as seen in the plane view.

(Configuration of Dilution Bottle)

Figure 2:
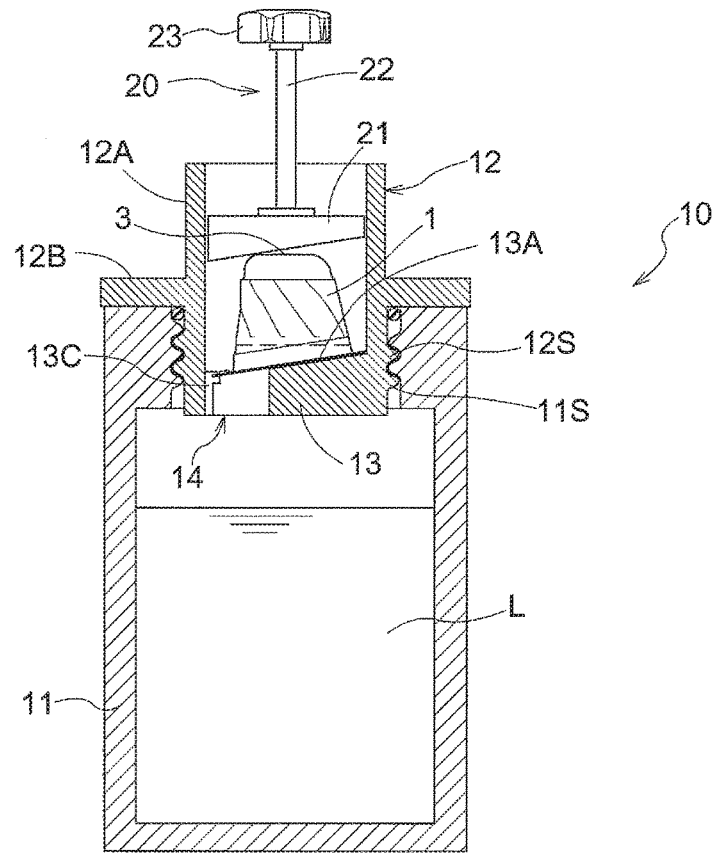
FIG. 2 is a section view showing the container as being set with a dilution bottle.

FIG. 2 shows an example of a bottle 10 that allows easy mixing of the contents C discharged from the portion container 1 with certain other liquid L or the like when used in combination with this portion container 1 and shows also the portion container 1 as being set to the bottle 10.

The bottle 10 shown in FIG. 2 includes a bottomed bottle body 11 having a relatively large capacity as compared with the portion container 1, an unsealing support member 12 provided at an upper portion of the bottle body 11, and a pressure applying member 20 supported to the inner face of the unsealing support member 12 to be vertically movable relative thereto.

The unsealing support member 12 includes a cylindrical portion 12A having an interior communicated to the interior of the bottle body 11 and a disc-shaped flange portion 12B extending radially outwards from a vertically intermediate position in the cylindrical portion 12A. The unsealing support member 12 is threaded to a female threaded portion 11S formed in an inner face of the opening of the bottle body 11 via a male thread 12S formed in the outer circumference of cylindrical portion 12A downwardly of the flange portion 12B.

Inside the cylindrical portion 12A, there is provided a container support portion 13, 13C for supporting the portion container 1 with the lid member 9 being oriented downwards.

The container support portion 13 includes a sloped face 13A which has a profile progressively decreased toward the opening 14 so as to establish communication between an upper inner space of the cylindrical portion 12A and the inside space of the bottle body 11.

The pressure applying member 20 includes a piston body 21 provided to be slidable relative to the inner face of the cylindrical portion 12A of the unsealing support portion 12, a bar-like support shaft 22 extending upwards from the upper face of the piston body 21, and a generally disc-like operational piece 23 attached to the upper end of the support shaft 22.

Figure 5:
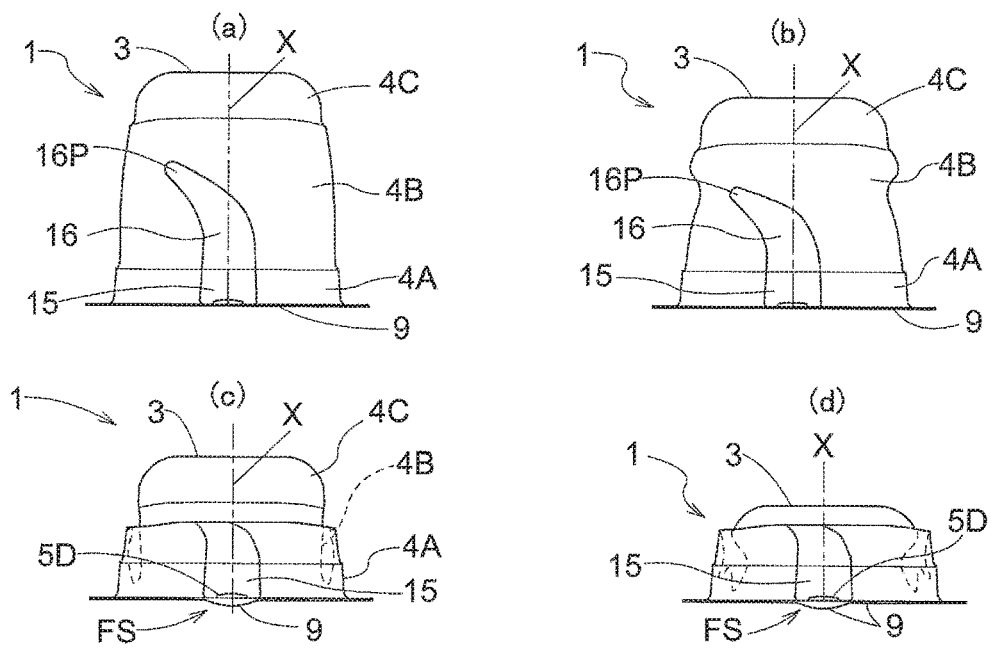
FIG. 5 is a plane view showing in (a) (d) a deforming step of the container.

When the user progressively presses down the pressure applying member 20 via the operational piece 23 with the portion container 1 being placed on the sloped face 13A of the container support portion 13, as illustrated in FIG. 5, the container body 2 is deformed to cause the inside pressure of this container body 2 to rise to reach a critical value, so that the lid member 9 will tend to detach from the flanged face 5A in the vicinity of the detaching seal portion 6S. However, as the detaching seal portion 6S is placed under the state of facing the opening 14 from the above, the lid member 9 will be detached freely without being interfered by e.g. the sloped face 13A, so the unsealing operation can proceed smoothly.

When the pressure applying member 20 is pressed down farther, as illustrated in FIG. 5 (d), there will occur vertically reducing deformation mainly in the side wall portion 4 of the container body 2, whereby most of the contents C will be discharged to the inside of the bottle body 11.

(Detailed Configuration of Side Wall Portion)

As shown in FIG. 4, the side wall portion 4 of the container body 2 comprises a cylindrical body whose diameter is progressively reduced toward the bottom face 3, and the side wall portion 4 includes a base end portion 4A extending from the back face of the flange 5 towards the bottom face 3, a leading end portion 4C extending from the bottom face 3 towards the flange 5, and an intermediate portion 4B interconnecting these base end portion 4A and leading end portion 4C.

The intermediate portion 4B is formed to obtain a smaller wall face thickness than the base end portion 4A and the leading end portion 4C, so that this intermediate portion 4B can be deformed more easily by an external force than the base end portion 4A and the leading end portion 4C. Incidentally, the arrangement for rendering the intermediate portion 4B more easily deformable than the two portions 4A, 4C can be provided by any other technique than the above, such as forming a folding line in the intermediate portion 4C alone.

Therefore, as the pressure applying member 20 is pressed down gradually via the operational piece 23 as described above, the deformation of the container body 2 will proceed with mainly the intermediate portion 4B having the smaller thickness in the side wall portion 4 collapsing.

FIG. 5 shows four states in sequence according to the sequence of deformation, from the initial state (a) in which the side wall portion 4 is not yet subject to any deformation to the state (d) in which the side wall portion 4 has been deformed sufficiently until most of the intermediate portion 4B advances into between the base end portion 4A and the leading end portion 4C.

In the instant embodiment, as illustrated in FIG. 5 (a) in particular, there are provided small radially extending steps adjacent the boundary between the base end portion 4A and the intermediate portion 4B and adjacent the boundary between the intermediate portion 4B and the leading end portion 4C. At the positions of these steps, the intermediate portion 4B has a smaller diameter than the base end portion 4A and the leading end portion 4C has a smaller diameter than the intermediate portion 4B, respectively.

Therefore, when the vertical reduction deformation occurs with the collapsing deformation of the side wall portion 4, as illustrated in FIG. 5 (d), deformation proceeds with a portion of the intermediate portion 4B entering the radial inner side of the base end portion 4A and with the leading end portion 4C entering the radial inner side of the intermediate portion 4B, respectively.

Further, in the instant embodiment, as illustrated in FIG. 5 (*a*) etc., at a circumferential portion of the side wall portion 4, there is formed a sloped sunk portion 16 which has a progressively reduced width as it is displaced from the end of the intermediate portion 4B (the lower end of the intermediate portion 4B in FIG. 5) generally toward the bottom face 3 to one left or right side (the left side in FIG. 5) in the circumferential direction when the container body 2 assumes the posture of the lid member 9 being oriented downwards and which includes an upper end portion 16P adjacent the boundary between the intermediate portion 4B and the leading end portion 4C.

As shown in FIG. 4 and FIG. 5, at a position in the base end portion 4A on the radially inner side of the engaged sunk portion 5B, there is provided a base end sunk portion 15 which extends linearly along an axis X from the back face of the flanged face 5A toward the bottom face 3. This base end sunk portion 15 is sunk in the form of an arc projecting radially inwards as seen in the plane view, and the sloped sunk portion 16 extends continuously from an end portion of the base end sunk portion 15 (the upper end of the base end sunk portion 15 in FIG. 5) toward the bottom face 3.

Then, when a vertical stress is applied to the side wall portion 4 by e.g. the pressure applying member 20, the stress or distortion will be concentrated in the vicinity of the upper end 16P of the sloped sunk portion 16, so that the collapsing deformation of the side wall portion 4 will begin from the vicinity of this upper end 16P, as illustrated in FIG. 5 (*b*).

The second view (b) in FIG. 5 illustrates a situation when the collapsing deformation of the side wall portion 4 has started at the portion of the sloped sunk portion 16 corresponding to the upper end 16P vicinity. When further vertical stress is applied thereto, a portion of the intermediate portion 4B will be bent radially inwards, thus realizing the state illustrated in the third view (c) in FIG. 5 in which it has advanced to the radially inner side of the base end portion 4A.

Next, when further vertical stress is applied from the state illustrated in FIG. 5 (*c*), the bent portion of the intermediate portion 4B projecting downwards on the radial inner side of the base end portion 4A will move within the intermediate portion 4B gradually towards the bottom face 3 and approaching the flange 5 at the same time, thus realizing the state illustrated in the fourth view (d) in FIG. 5 in which the side wall portion 4 has been deformed sufficiently until most of the intermediate portion 4B has advanced into between the base end portion 4A and the leading end portion 4C.

Figure 7:
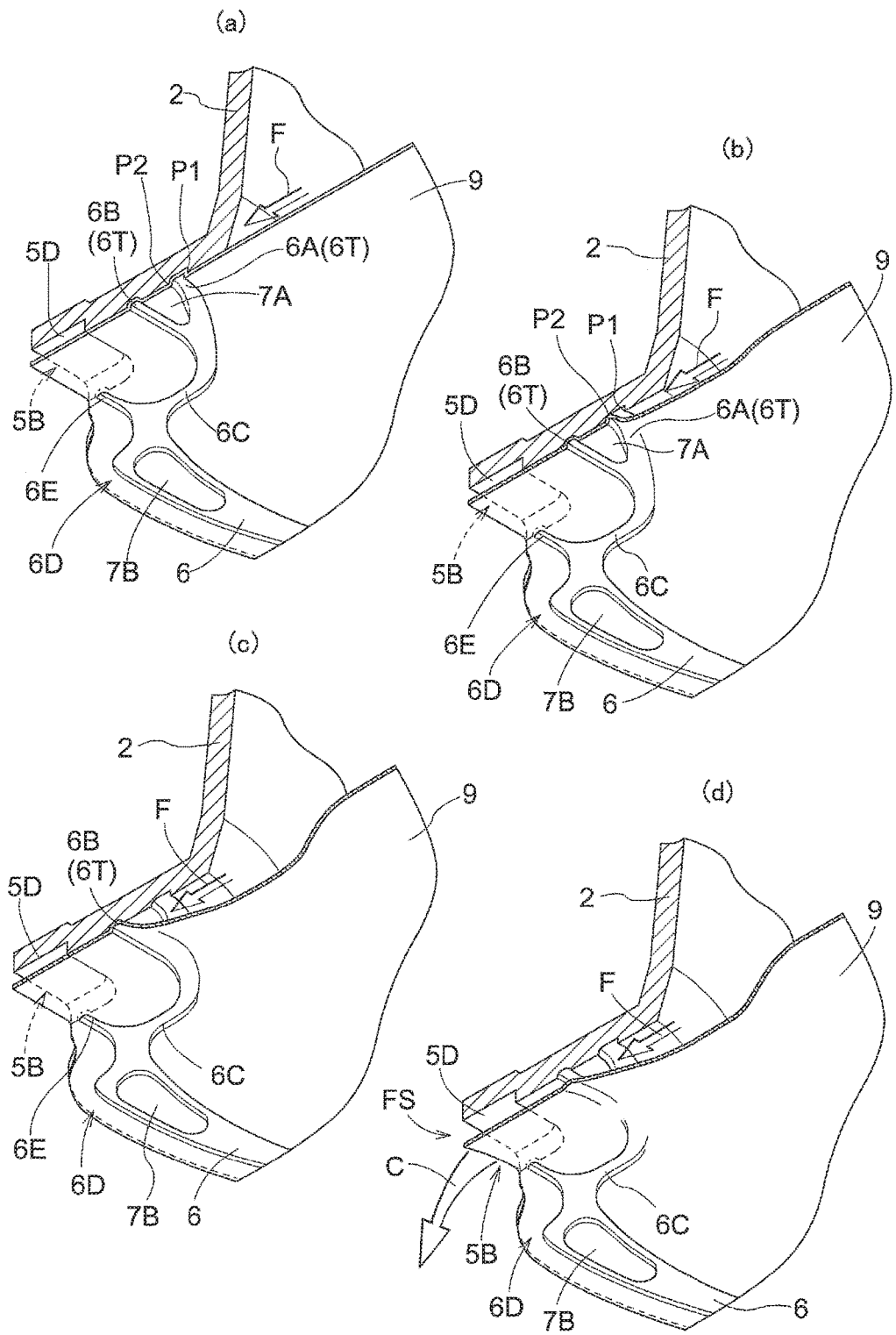
FIG. 7 is a perspective view illustrating in (a) (d) a detaching step of a detaching seal portion.

In the course of the above, under the state illustrated in the third view (c) in FIG. 5 at the latest, the lid member 9 will be detached from the flange 5A only at the detaching seal portion 6S as illustrated in FIG. 7 (*d*), so that unsealing is effected to allow start of discharge of the contents C from between the outflow groove 5D and the lid member 9. In this, between the outflow groove 5D and the back face of the detached lid member 9, as shown in FIG. 5 and FIG. 7, there will be formed a cylindrical outflow guiding space FS extending in the radial direction, so the contents C will be discharged in a stable manner as being guided by this cylindrical outflow guiding space.

Incidentally, in the intermediate portion 4B of the side wall portion 4, in order to prevent deformation by a shock during transportation for instance, there are formed a plurality of narrow line-like recesses 8 in the form of ribs arranged equidistantly and inclined along the same direction along the axis X, for the purpose of obtaining higher strength at thin-walled portion.

(Detailed Configuration of Annular Seal Portion)

Figure 6:
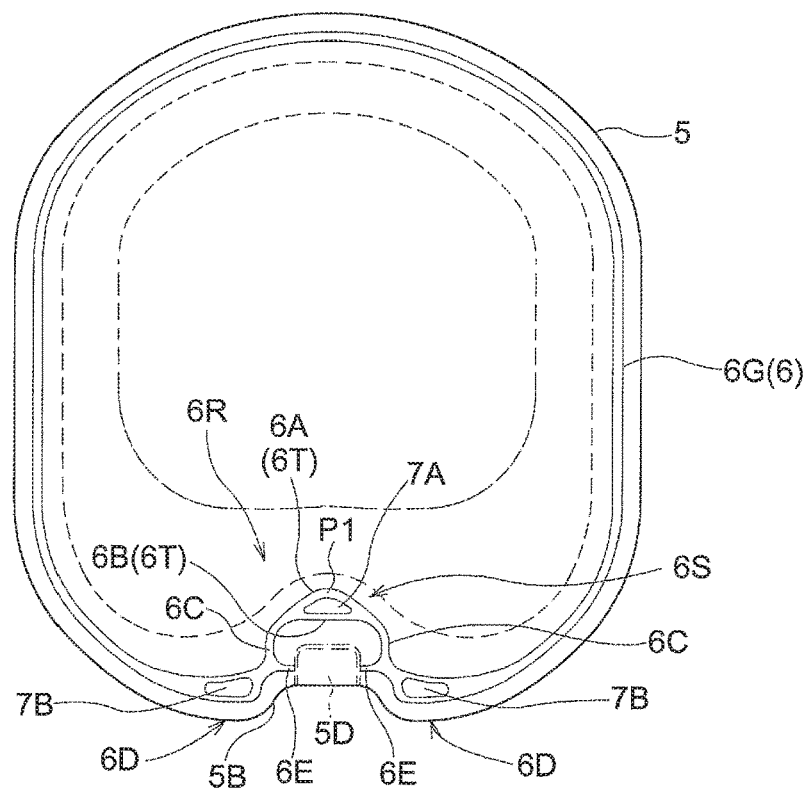
FIG. 6 is a plane view showing an annular seal portion.

As shown in FIG. 1 and FIG. 6, the annular seal portion 6 sealing between the container body 2 and the lid member 9 is configured such that rather than this seal portion 6 being face-fused and bonded across the entire width of the flanged face 5A over the entire circumference, the portion 6 is fused and bonded in the form of a line occupying only a portion of the width of the flanged face 5A.

More specifically, the annular seal portion 6, as shown in FIG. 6, includes a triangular seal portion 6T provided in the form of a triangle including a triangular first insular portion 7A at a position on the radial inner side of the engaged sunk portion 5B, an ordinary seal portion 6G formed longest in the form of a ring or a line projecting toward the radial outer side at the portion of the flanged face 5A excluding the engaged sunk portion 5B, a pair of left and right non-detaching seal portions 6D provided from the opposed ends of the ordinary seal portion 6G in such a manner to include a second insular portion 7B with an offset toward the engaged sunk portion 5B, and a pair of left and right connecting annular seal portions 6C connecting the triangular seal portion 6T and the non-detaching seal portions 6D.

Incidentally, in this detailed description, the term "insular portion" refers to a portion where the lid member 9 is not fused and bonded intentionally and partially to the flanged face 5A, but is left in the form of an island inside the bonded portion present in its surrounding.

Further, the annular seal portion 6 includes a pair of left and right auxiliary non-detaching seal portions 6E extending from the vicinity of the boundary between the non-detaching seal portions 6D and the connecting seal portion 6C to be disposed to face each other across the outflow groove 5D therebetween.

The triangular portion 6T only one which is provided and the non-detaching seal portions 6D two of which are provided exhibit an ring-shape including the first insular portion 7A and the second insular portion 7B therein, such that a secondary ring-like portion is included in a portion of the overall primary ring-like portion formed by the annular seal portion. Here, the "primary ring-like portion" refers to a single large seal portion extending to surround the entire opening of the container body 2, whereas the "secondary ring-like portion" refers to a small seal portion extending to surround the first insular portion 7A and the second insular portion 7B.

In the instant embodiment, the triangular seal portion 6T mainly constitutes the detaching seal portion 6S which can be detached more easily than the remaining portion of the annular seal portion 6 by increase of the inside pressure of the container body 2.

The triangular seal portion 6T is provided along the region corresponding to the radial inner side of the engaged sunk portion 5B in the flanged face 5A and exhibits as a whole a shape of an isosceles triangle projecting toward the radial inner side of the annular seal portion 6 in left-right symmetry.

In the triangular seal portion 6T, the two sides thereof located on the radial inner side of the above isosceles triangle, provide a reverse-oriented annular seal portion 6A which is curved to project toward the radial inner side of the opening in the plane view, conversely from the ordinary seal portion 6G.

On the other hand, the one side corresponding to the base on the radial outer side of the isosceles triangle forms an auxiliary seal portion 6B which extends linearly to interconnect the opposed ends of the reverse-oriented seal portion 6A.

As a result of its geometric feature of being curved to project towards the radial inner side, in the event of increase of the inside pressure associated with deformation of the container body 2, a radially inwardly oriented leading end P1 of the reverse-oriented annular seal portion 6A (see FIG. 6 and FIG. 7) will be the portion where the inside pressure of the container body 2 is concentrated most in the annular seal portion 6, so that the reverse-oriented annular seal portion 6A serves as a detachment start portion where detachment of the lid member 9 starts with this inside pressure.

FIG. 7 shows four views arranged in accordance with progress of exfoliation (detachment), from the initial sate (a) when detachment of the lid member 9 or detachment of the annular seal portion 6 is not yet started to the state (d) when the detachment of the lid member 9 at the detaching seal portion 6S by the inside pressure F of the container body 2 has been completed.

The second view (b) in FIG. 7 illustrates a state when exfoliation of the lid member 9 has been started at the leading end P1 of the reverse-oriented annular seal portion 6A. The third view (c) in FIG. 7 illustrates a state when the exfoliation of the lid portion 9 has progressed over the entirety of the reverse-oriented annular seal portion 6A, but no exfoliation has occurred yet at the linear-shaped auxiliary detaching seal portion 6B.

As shown in the third view (c), after exfoliation of the reverse-oriented annular seal portion 6A, the inside pressure F of the container body 2 will be concentrated most at the auxiliary detaching seal portion 6B. So, exfoliation of the lid member 9 will proceed at this auxiliary detaching seal portion 6B with the inside pressure F.

As the result of progress of exfoliation of the lid member 9 at the auxiliary detaching seal portion 6B, as illustrated in (d) in FIG. 4, when at least a portion of the auxiliary detaching seal portion 6B has been detached, partial detachment of the annular seal portion 6 will be accomplished, whereby discharge of the contents C from the container body 2 will start.

Finally, as illustrated in the fourth view (d) in FIG. 7, when the exfoliation of the lid member 9 has occurred along the entire length of the linear-shaped auxiliary detaching seal portion 6B, in other words, when the exfoliation/ unsealing has occurred only at the region of the triangular seal portion 6T constituting generally the detaching seal portion 6S, detachment of the annular seal portion 6 will be completed. Yet, a necessary outflow channel will be maintained to allow discharging of the contents C entirely at an appropriate rate.

Figure 8:
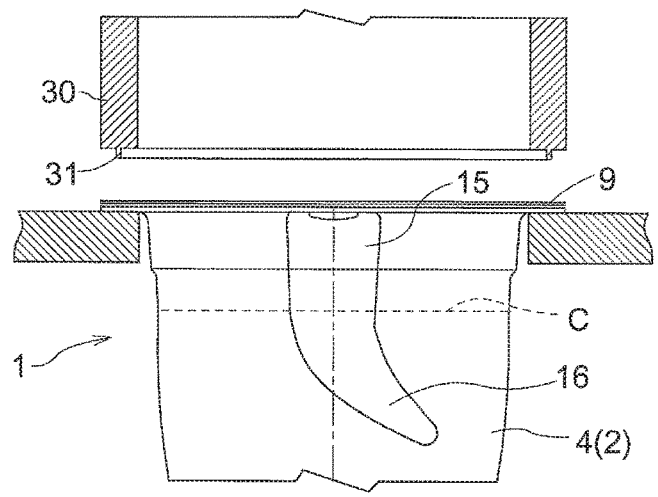
FIG. 8 is a section view illustrating a sealing step of an annular seal portion by a seal bar.

Incidentally, as illustrated in FIG. 8, the annular seal portion 6 is sealed by pressing the lid member 9 against the flanged face 5A of the container body 2 by a predetermined period (e.g. from 1 to a few seconds) be means of a hot seal bar 30 having an annular projection 31 having a shape corresponding to the shape of this annular seal portion 6 at its lower end.

Therefore, of a plurality of layers made of laminate films constituting the lid member 9, the lowermost layer contacting the flanged face 5A includes a heat seal layer (not shown) containing polyolefin-based resin having a function of being temporarily softened with application of heat and pressure from the seal bar 30, thus heat-fused and bonded to the flanged face 5A.

By the pressing of the seal bar 30, the lid member 9 will be fusedly bonded to the flanged face 5A with the heat seal layer at the portion corresponding to the annular projection 31 provided at the lower end of the seal bar 30. At the same time, a groove-like sunk portion corresponding to the annular projection 31 will be formed in the flanged face 5A.

As a result of research effort made in connection with the present invention, there was obtained a finding that in the cross sectional shape of the groove of the annular seal portion 6, the edge portions of the groove (the portions slightly raised on the opposed sides of the groove) show strongest bonding force. It was therefore found that in order to obtain a stronger bonding force, increase of the number of grooves is more effective than simply increasing the bonding area or increasing the width size of the groove to be formed by the seal bar 30.

Figure 9:
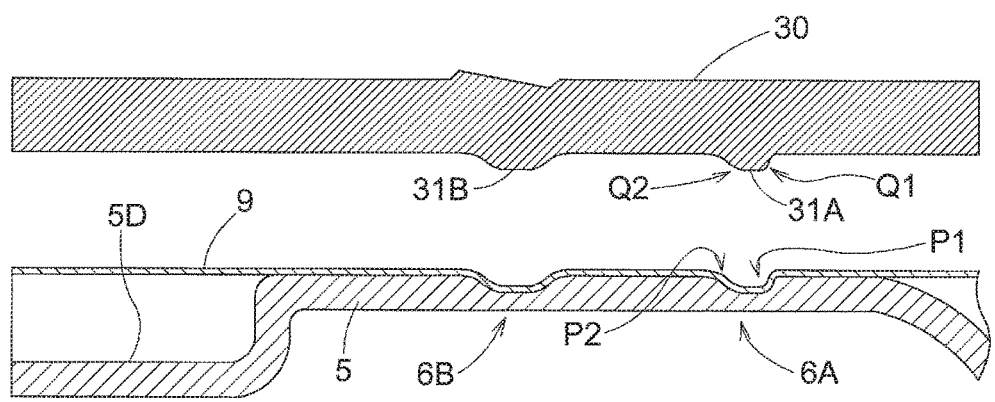
FIG. 9 is a section view showing the annular seal portion and an annular projection of the seal bar.

Further, although the cross sectional shape of the annular projection 31 is a significant factor that controls the bonding force of the annular seal 6, as illustrated in FIG. 9, respecting the annular projection 31 provided to form most of the annular seal portion 6 including the ordinary seal portion 6G, this projection 31 is provided with a shape having a same shape at its radially inner portion and its radially outer portion, that is, a left/right symmetric cross sectional shape.

Conversely, respecting an annular projection 31A provided to form the reverse-oriented annular seal portion 6A, its radially outer side portion (Q2 in FIG. 9) has a curvature radius substantially equal to that of the annular projection 31B provided to form the other auxiliary detaching seal portion 6B, but its radially inner side portion (Q1 in FIG. 9) is provided with a smaller curvature radius than the radially outer side portion Q2, thus provided with a special cross sectional shape non-right/left symmetric.

Therefore, as shown in the lower portion in FIG. 9, the cross section of the reverse-oriented annular seal portion 6A sealed by the annular projection 31A has a special shape with the radially inner portion being sunk to face the bottom face 3 at a more acute angle as compared with the radially outer portion. That is, the groove of the reverse-oriented annular seal portion 6A formed by the seal bar 30 constitutes an "uneven sealing force groove" where resistance against a detaching force applied from the radial inner side is distinctly smaller than resistance against a detaching force applied from the radial outer side. As a result, at the radially inner portion of the reverse-oriented annular seal portion 6A, exfoliation will occur with a lower inside pressure F as compared with the remaining portion of the annular seal portion 6, so that the above-described leading end P1 can function as the exfoliation start point reliably.

On the other hand, the portion (P2) located on the radially outer side of the reverse-oriented annular seal portion 6A has the standard cross sectional shape sunk to be oriented toward the bottom face 3 at the substantially equal angle to that of e.g. the auxiliary detaching seal portion 6B. Thus, inconvenience of inadvertent unsealing of the lid member 9 by an external force which may be applied in the course of transportation/distribution.

Next, the pair of left and right non-detaching seal portions 6D, as shown in FIG. 7, are disposed on the circumferentially outer sides relative to the outflow groove 5D, with two annular seal portions extending in the circumferential direction to surround the second insular portions 7B which respectively exhibit a streamline shape as seen in the plane view. In this way, in each detaching seal portion 6D, the two annular seal portions surrounding the second insular portion 7B are provided. This arrangement serves to double the number of the edge portions of the groove described above. As a result, at this portion, the lid member 9 is bonded with a bonding force which far exceeds the bonding force provided by the ordinary seal portion 6G comprised of a single annular seal portion. Further, the portion of the annular projection 31A sealing the non-detaching seal portion 6D has the ordinary left/right symmetric cross sectional shape having the curvature radius substantially equal to that of e.g. the auxiliary detaching seal portion 6B. Consequently, even when the rate of increase of the inside pressure of the container body 2 exceeds a generally expected range, the possibility of the detaching starting at the detaching seal portion 6S extending inadvertently to the non-detaching seal portion 6D is small.

The triangular seal portion 6T and each non-detaching seal portion 6D are connected to each other via the one of the left and right pair of connecting annular seal portions 6C. From the vicinity of the boundary between the non-detaching seal portions 6D and the connecting annular seal portions 6C, the pair of left and right auxiliary non-detaching seal portions 6E extend to the position immediately before the outflow groove 5D in such a manner to be disposed to face each other across this outflow groove 5D therebetween. Respecting the connecting annular seal portion 6C and the auxiliary non-detaching seal portion 6E, these seal portions 6C, 6E too have the ordinary left-right symmetric cross sectional shape with the curvature radius substantially equal to that of e.g. the auxiliary detaching seal portion 6B.

As illustrated in the last view (d) in FIG. 7, the pair of left and right auxiliary non-detaching seal portions 6E too will not be detached like the non-detaching seal portions 6D, and the auxiliary non-detaching seal portion 6E provides the function of limiting the width of the outflow channel to be formed by exfoliation of the lid member 9 below an expected value (agreeing to the width of the triangular seal portion 6T, that is, the length of the auxiliary detaching seal portion 6*b*).

Other Embodiments

Figure 10:
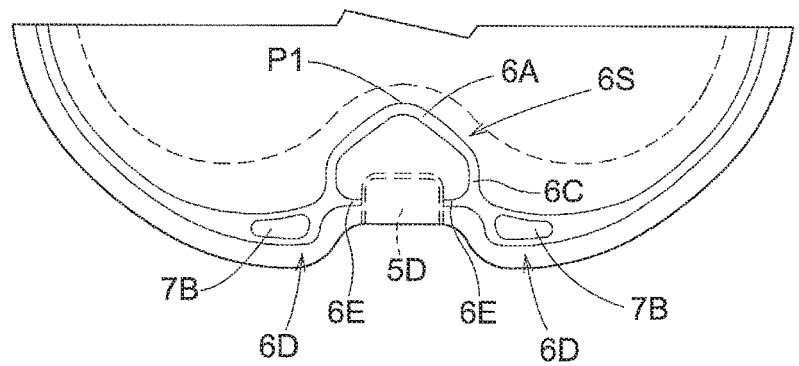
FIG. 10 is a plane view showing a further embodiment of the detaching seal portion.
Figure 11:
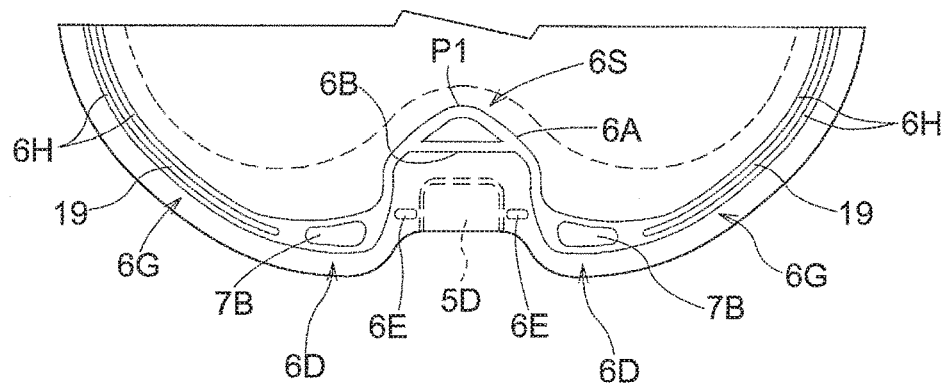
FIG. 11 is a plane view showing a further embodiment of the annular seal portion.

<1> When there is less need to take into consideration the influence of external force such as in the course of distribution/transportation, as illustrated in FIG. 10, the detaching seal portion 6S can be alternatively embodied with omission of the auxiliary detaching seal portion 6B corresponding to the base of the isosceles triangle constituting the triangular seal portion 6T in the foregoing embodiment.

<2> In the foregoing embodiment, inside the triangular seal portion 6T, the first insular portion 7A as a non-seal portion was left. Instead, without leaving such first insular portion 7A inside the triangular seal portion 6T, the inner side of this triangular seal portion 6T may be sealed entirely.

<3> The ordinary seal portion 6G other than the detaching seal portion 6S in the annular seal portion 6 can be provided with a multiple structure in which a plurality of line-like seal portions 6H are present on the radially inner and outer sides across long non-sealing portions 19. This arrangement can further increase the sealing strength of the ordinary seal portion 6G.

Figure 12:
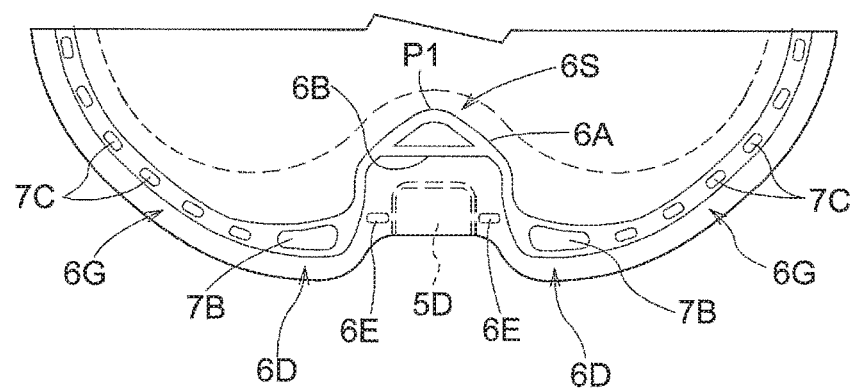
FIG. 12 is a plane view showing a still further embodiment of the annular seal portion.

<4> Or, as illustrated in FIG. 12, the sealing strength of the ordinary seal portion 6G can be further increased also by implementing a structure wherein the ordinary seal portion 6G is provided with a large radial width, inside of which many circular or oval-shaped insular non-sealing portions 7C are arranged along the circumferential direction.

Figure 13:
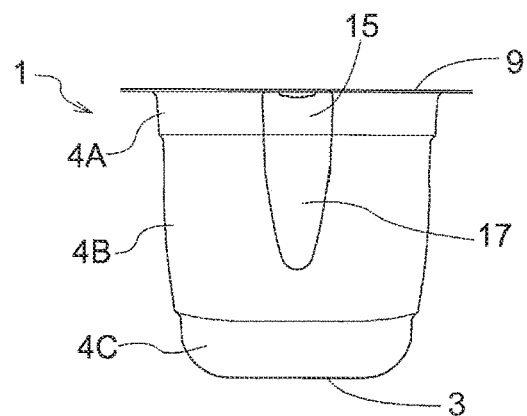
FIG. 13 is a section view showing a further embodiment of a deformation controlling recess.

<5> As illustrated in FIG. 13, instead of the sloped sunk portion 16, there may be provided a perpendicularly sunk portion 17 (an example of "deformation controlling recess") which extends with a progressively reduced width generally along the generating line of the side wall from the end portion of the base end sunk portion 15 (the lower end of the base end sunk portion 15 in FIG. 13) towards the bottom face 3. In this case too, similar effect to the effect provided by the sloped sunk portion 16 can be obtained.

<6> The contents to be held in the portion container is not limited to liquid, but can be e.g. mixture of powder and liquid, mixture of powder and gas, etc.

INDUSTRIAL APPLICABILITY

This invention is applicable as a technique to solve the problem conventionally found in a portion container including a container body holding contents therein and a lid member for closing an opening of the container body, the container body and the lid member being sealed by an annular seal portion formed along a flanged face of the opening.

DESCRIPTION OF REFERENCE MARKS/NUMERALS

1: portion container (container)
2: container body
3: bottom face
4: side wall portion
5: flange
5A: flanged face
5D: outflow groove
6: annular seal portion
6A: reverse-oriented annular seal portion
6B: auxiliary detaching seal portion
6C: connecting annular seal portion
6D: non-detaching seal portion
6E: auxiliary non-detaching seal portion
6G: ordinary seal portion
6S: detaching seal portion
6T: triangular seal portion
7A: first insular portion
7B: second insular portion
9: lid member
10: dilution bottle
30: seal bar
31: annular projection
31A: annular projection
31B: annular projection
C: contents
P1: leading end
X: axis

The invention claimed is:

1. A container including a container body holding contents therein and a lid member for closing an opening of the container body, the container body and the lid member being sealed with each other by an annular seal portion formed along a flanged face of the opening;
    wherein at a specified portion of the annular seal portion, there is provided a detaching seal portion which is detached in response to increase of pressure inside the container body associated with deformation of the container body; and
    the detaching seal portion includes a reverse-oriented annular seal portion which occupies a part of a width of the flanged face and which projects toward a radial inner side of the opening;
    wherein there is provided an auxiliary detaching seal portion which connects opposed ends on the radial outer side of the reverse-oriented annular seal portion;
    wherein the reverse-oriented annular seal portion and the auxiliary detaching seal portion form a triangular shape in which the reverse-oriented annular seal portion comprises two sides of the triangle projecting toward the radial inner side of the opening and the auxiliary detaching seal portion comprises a base of the triangle connecting opposed ends of the two sides of the triangle on the radial outer side of the opening.

2. The container according to claim 1, wherein:
an outflow channel for discharging the contents extends radially outwards from the detaching seal portion; and
at positions facing the outflow channel from the left and right sides thereof, there are provided non-detaching seal portions comprised of a plurality of annular seal portions extending along a circumferential direction.

3. The container according to claim 2, wherein:
the detaching seal portion and the non-detaching seal portion are connected to each other via a pair of left and right connecting annular seal portions; and
between a portion of the pair of connecting annular seal portions and the outflow channel, there are provided a pair of auxiliary non-detaching seal portions facing each other across the outflow channel therebetween.

4. The container according to claim 2, wherein at a position of the flanged face of the container body corresponding to the outflow channel, there is formed an outflow groove sunk toward the bottom of the container body.

5. The container according to claim 1, wherein:
the annular seal portion is provided in the form of a groove sunk in the thickness direction of the flanged face by pressing the lid member against the flanged face via a seal bar having at its leading end an annular projection having a shape corresponding to the annular seal portion; and
the reverse-oriented annular seal portion is provided as an uneven sealing force groove having a smaller curvature radius on its radial inner side than its radial outer side.

* * * * *

UNITED STATES PATENT AND TRADEMARK OFFICE
CERTIFICATE OF CORRECTION

PATENT NO. : 10,093,471 B2
APPLICATION NO. : 14/902088
DATED : October 9, 2018
INVENTOR(S) : Bushida et al.

Page 1 of 1

It is certified that error appears in the above-identified patent and that said Letters Patent is hereby corrected as shown below:

On the Title Page

Item (73), Assignee, please correct the first Assignee name to read:
-- SUNTORY HOLDINGS LIMITED, Osaka (JP) --.

Signed and Sealed this
Twenty-fifth Day of June, 2019

Andrei Iancu
*Director of the United States Patent and Trademark Office*